(12) United States Patent
Välikangas

(10) Patent No.: US 7,252,301 B2
(45) Date of Patent: Aug. 7, 2007

(54) SNOWMOBILE SKI WITH ALIGNMENT POINTS

(75) Inventor: Jyri Välikangas, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 127 days.

(21) Appl. No.: 11/050,192

(22) Filed: Feb. 2, 2005

(65) Prior Publication Data

US 2006/0170195 A1    Aug. 3, 2006

(51) Int. Cl.
*A63C 5/00* (2006.01)
(52) U.S. Cl. .................. 280/609; 280/28; 280/14.26
(58) Field of Classification Search ................ 280/606, 280/609, 817, 818, 14.26, 14.25, 28
See application file for complete search history.

(56) References Cited

U.S. PATENT DOCUMENTS

| | | | | |
|---|---|---|---|---|
| 3,760,507 A * | 9/1973 | LaRocca | .................. | 33/203.17 |
| 4,115,926 A * | 9/1978 | Hampton et al. | ............. | 33/288 |
| 4,455,759 A * | 6/1984 | Coetsier | ...................... | 33/288 |
| 5,165,709 A * | 11/1992 | Jacques | ........................ | 280/28 |
| 5,398,419 A * | 3/1995 | Schmidt et al. | ............... | 33/203 |
| 5,443,278 A * | 8/1995 | Berto | ........................... | 280/28 |
| 5,488,472 A * | 1/1996 | January | ................. | 356/139.09 |
| 6,199,648 B1 * | 3/2001 | Kanan | ......................... | 180/182 |
| 6,331,008 B2 * | 12/2001 | Cormican | ..................... | 280/22 |
| 6,513,612 B2 * | 2/2003 | Moriyama et al. | .......... | 180/182 |

* cited by examiner

*Primary Examiner*—Christopher Bottorff
(74) *Attorney, Agent, or Firm*—Osler, Hoskin & Harcourt LLP

(57) ABSTRACT

A snowmobile ski includes front and rear alignment points, which are preferably notches in the outer ribs of each of the skis. The notches facilitate alignment of the skis by receiving the end of a tape measure that is used to measure front and rear distances between corresponding front notches and corresponding rear notches of the skis. In one variant, the notches are equidistant from the skags to further simplify the task of aligning the skis.

24 Claims, 5 Drawing Sheets

SNOWMOBILE SKI WITH ALIGNMENT POINTS

FIELD OF THE INVENTION

The present invention relates generally to a snowmobile and, more particularly, to a snowmobile ski.

BACKGROUND OF THE INVENTION

The steering and handling of a snowmobile is highly dependent on the proper alignment of the front skis (hereinafter simply the skis). If the skis are misaligned, i.e. not parallel, the snowmobile will handle poorly and tend to veer off course. Extreme misalignment can make the vehicle almost impossible to drive. The "toe" of the front skis is a term of art referring to the misalignment of the skis. "Toe-in" means that the skis converge, i.e. point inwardly with respect to each other in the forward, travel direction of the vehicle whereas "toe-out" means that the skis diverge, i.e. point outwardly with respect to each other in the forward, travel direction.

As is known by those of ordinary skill in the art, a very small degree of toe-out is sometimes desired since this creates a force which forces the skis to the toed-out position and thus takes up any slack that might arise due to wear and tear or due to manufacturing tolerances. Although it is desired to make the skis perfectly parallel, they are, in practice, often assembled either slightly toed-in or toed-out, and therefore it is sometimes (but certainly not always) preferable to err on the side of toe-out during initial alignment of the skis.

Misalignment of the skis can arise because of human error in the initial installation of the skis and also because of collision with foreign objects, which can knock the skis out of alignment, as is the case with most other land vehicles.

Referring to FIG. 1, the initial alignment of a pair of skis 26 of a conventional snowmobile 10 is conventionally performed by eye, via iterative readjustments of left and right steering rods 29 connected respectively to the skis. When initially connected to the snowmobile 10, the steering rods 29 are normally not equal in length on both sides of the snowmobile. In order to initially align the skis 26 to ensure that both are pointing straight ahead, the handlebars 36 are first positioned in the straight-ahead direction. Then, by measuring the distance between the two skis 26, once at the front end of each of the skis and once at the rear end of the skis, one can determine if the skis are misaligned. In other words, a distance D1 is measured between corresponding points 25 on the front of the skis and a distance D2 is measured between corresponding points 27 on the rear of the skis. If D1<D2, then the skis are toe-in. If D1>D2, then the skis are toe-out. Ideally, the D1=D2 so that the skis are aligned, i.e. parallel to each other.

If the skis are misaligned, the lengths of the steering rods are altered to realign the skis. Each time the steering rods are altered, the distances D1 and D2 are re-measured to see if they are now in alignment with each other. Each subsequent iteration (measurement and adjustment) brings the skis closer and closer into parallel alignment with each other.

In the prior art, the traditional methods of determining if the skis are indeed pointing straight ahead, i.e. that they are sufficiently parallel to each other, is by measuring the distances D1 and D2 between the skis at front and rear locations. However, measuring front and rear distances is fraught with error as the exact distance between the skis is quite difficult to repeatedly measure since there are no easy reference points on the skis.

The skis typically have "skags" (i.e. a generally straight steel runner on the underside of each ski) that are designed to be parallel to each other but, since these are on the underside, these are not easily accessible.

Furthermore, the skis themselves are not straight-edged along their length, i.e. they generally are shaped with curved side edges. Thus, it is not a simple task to simply measure the distance from one ski edge to another in a consistent and repeatable manner since the inner and outer edges do not define a clearly identifiable reference point. To arbitrarily select forward and rearward reference points on curved-edge skis generally results in poor measurements and continued misalignment of the skis.

Yet another prior-art approach to aligning skis (which is illustrated in FIG. 2) has been to use the studs that attach the skag 31 to the ski 26 as reference points. The studs 33 are normally aligned with the centre of the skag 31, traversing the bottom surface of each ski 26. A user can then align a tape measure 35 above the tops of corresponding studs 33 on each ski 26 to measure the distance D between the skags 31. When the skags 31 are aligned with each other, so are the skis 26 since the skags are affixed to the skis in a parallel relationship. However, this latter technique requires two people since the tape measure must be held inline with the studs while being above each stud since the stud is below the plastic side wall 37 of the ski, thus preventing the measuring tape 35 from being hooked directly onto the stud 33. Moreover, since the tape measure 35 must be held exactly above the stud 33 to get an accurate measurement, this technique naturally introduces a substantial measuring error.

Therefore, it would be highly desirable to provide a snowmobile ski that overcomes at least one of the deficiencies of the prior art as described above.

SUMMARY OF THE INVENTION

It is an object of the present invention to provide a snowmobile ski having alignment points for facilitating the task of aligning the skis on a snowmobile.

In accordance with one aspect of the present invention, a snowmobile ski includes a front alignment point defining a first reference point for measuring a distance D1 between the front alignment point and a corresponding front alignment point on a paired ski; and a rear alignment point defining a second reference point for measuring a distance D2 between the rear alignment point and a corresponding rear alignment point on the paired ski, whereby the ski and the paired ski are aligned by adjusting D1 to be equal to D2. The alignment points are capable being physically (and preferably visually) perceived by a user of the ski as being a distinct point for aligning the ski Preferably, the front alignment point includes a flat surface substantially parallel to a central longitudinal axis of the ski, the flat surface being capable of receiving an end of a tape measure used to measure the distance D1 between the front alignment point and the corresponding front alignment point on the paired ski; and the rear alignment point includes a flat surface substantially parallel to the central longitudinal axis of the ski, the flat surface being capable of receiving the end of the tape measure used to measure the distance D2 between the rear alignment point and the corresponding rear alignment point on the paired ski.

More preferably, the front and rear alignment points are formed as notches in outer ribs of the ski which are adapted to receive an end of a tape measure for quickly and easily measuring distances between corresponding front and rear alignment points.

In accordance with another aspect of the present invention, a snowmobile has a frame including a tunnel; an engine disposed on the frame; a drive track disposed below and supported by the tunnel and operatively connected to the engine for propulsion of the snowmobile; a straddle seat disposed on the tunnel above the drive track and rearward of the engine; and two steerable skis having alignment points as described in the preceding paragraphs.

In accordance with yet another aspect of the present invention, a method of aligning skis on a snowmobile includes the steps of measuring a front distance D1 between corresponding front alignment points on the skis; measuring a rear distance D2 between corresponding rear alignment points on the skis; and readjusting the skis to make D1 equal to D2.

Preferably, the method includes providing front alignment points having flat surface substantially parallel to central longitudinal axes of the skis and rear alignment points having flat surfaces substantially parallel to the central longitudinal axes of the skis.

More preferably, the method includes providing the front and rear alignment points with a notch in a rib of the ski to facilitate measurement of distances D1 and D2.

The snowmobile ski and method described in the foregoing paragraphs greatly facilitate the task of aligning skis on a snowmobile. Due to the front and rear alignment points, measurements of the distances D1 and D2 can be quickly and easily obtained by a single person, thus enabling rapid and simple alignment of a snowmobile's skis.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION OF THE PREFERRED EMBODIMENT

Figure 1:
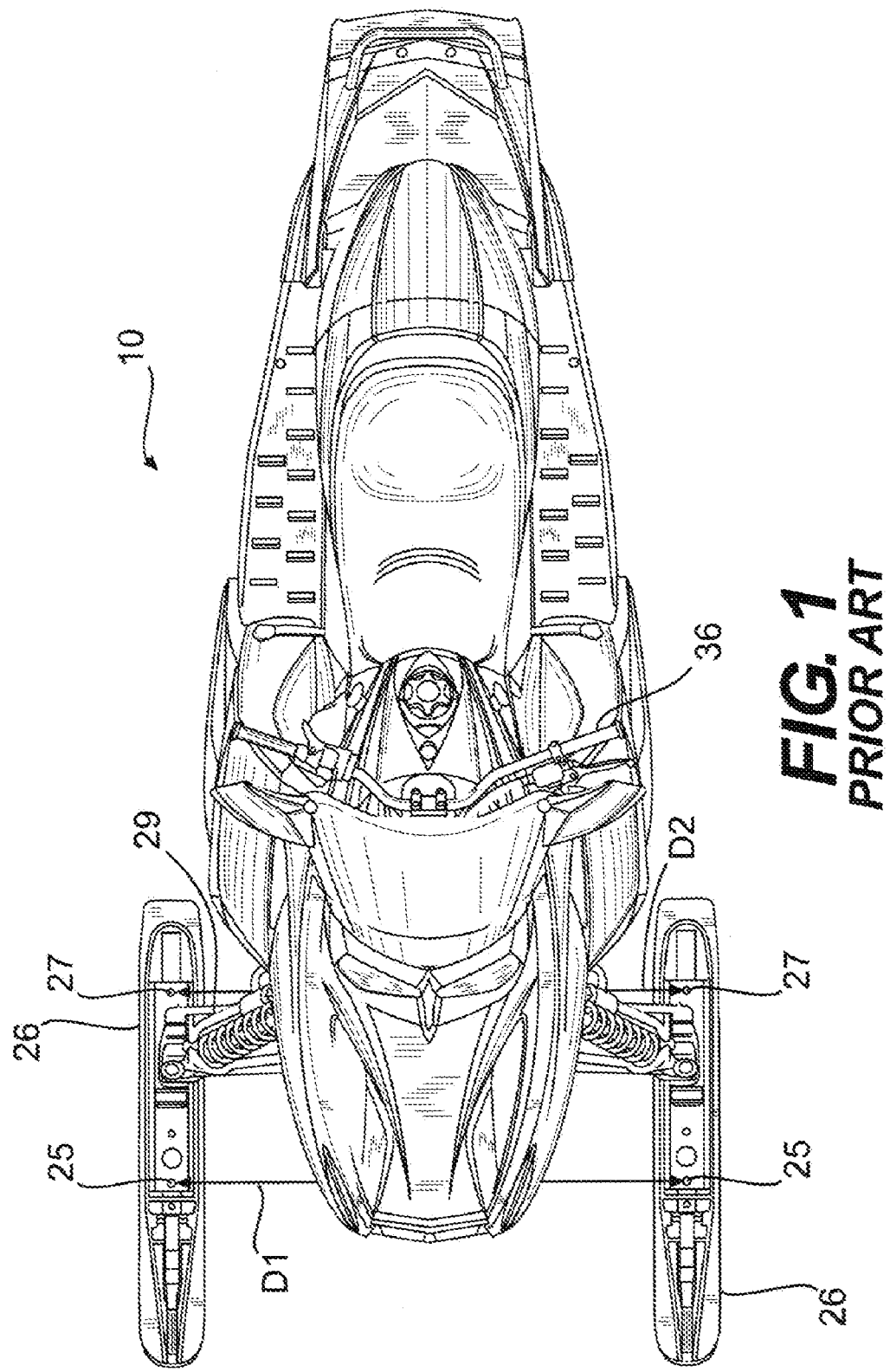
FIG. 1 is a top plan view of a snowmobile having skis that are aligned using prior-art techniques.
Figure 2:
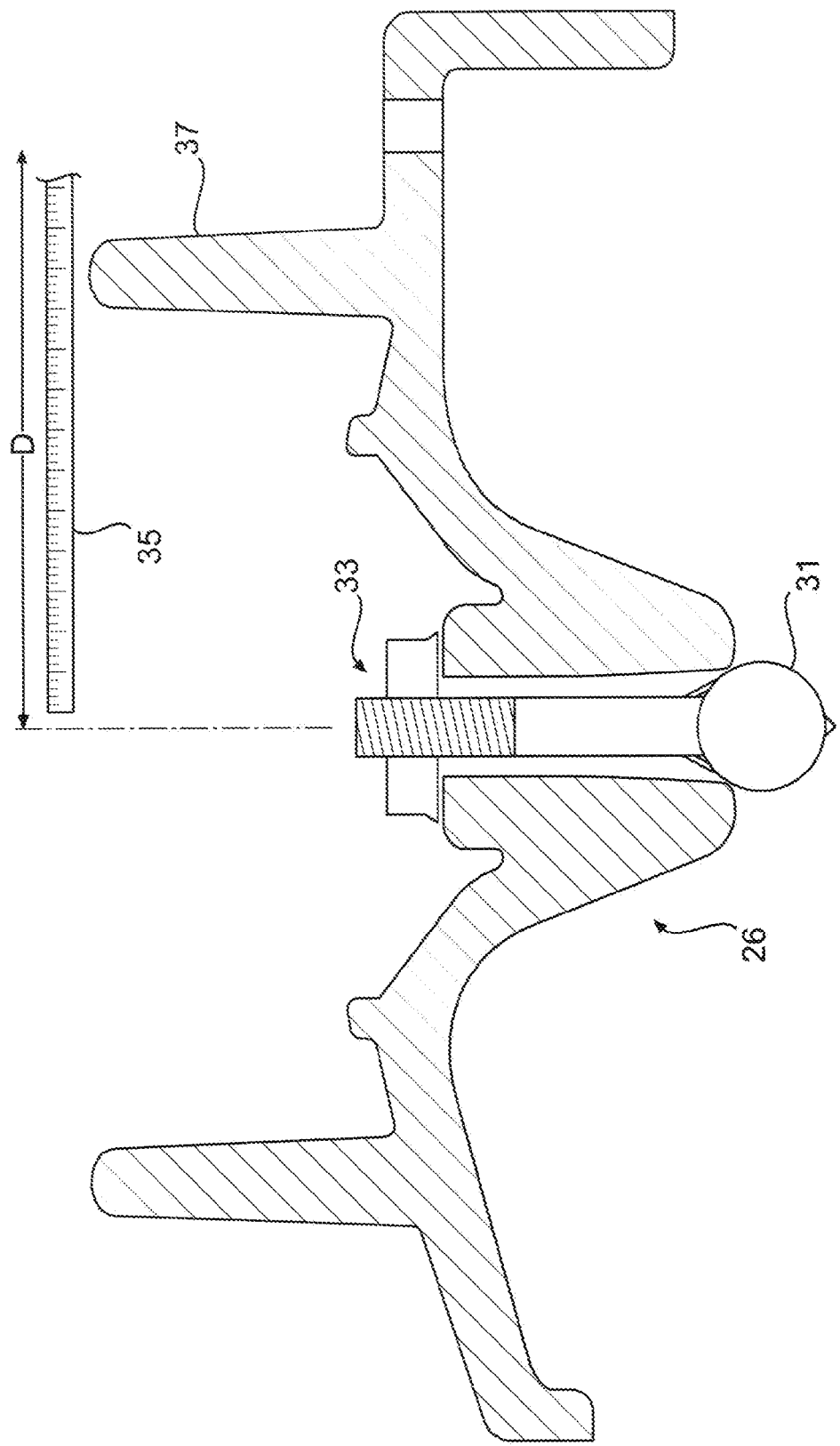
FIG. 2 is a cross-sectional view of a prior-art snowmobile ski showing an alignment technique using the stud affixing the skag to the ski as a reference.
Figure 3:
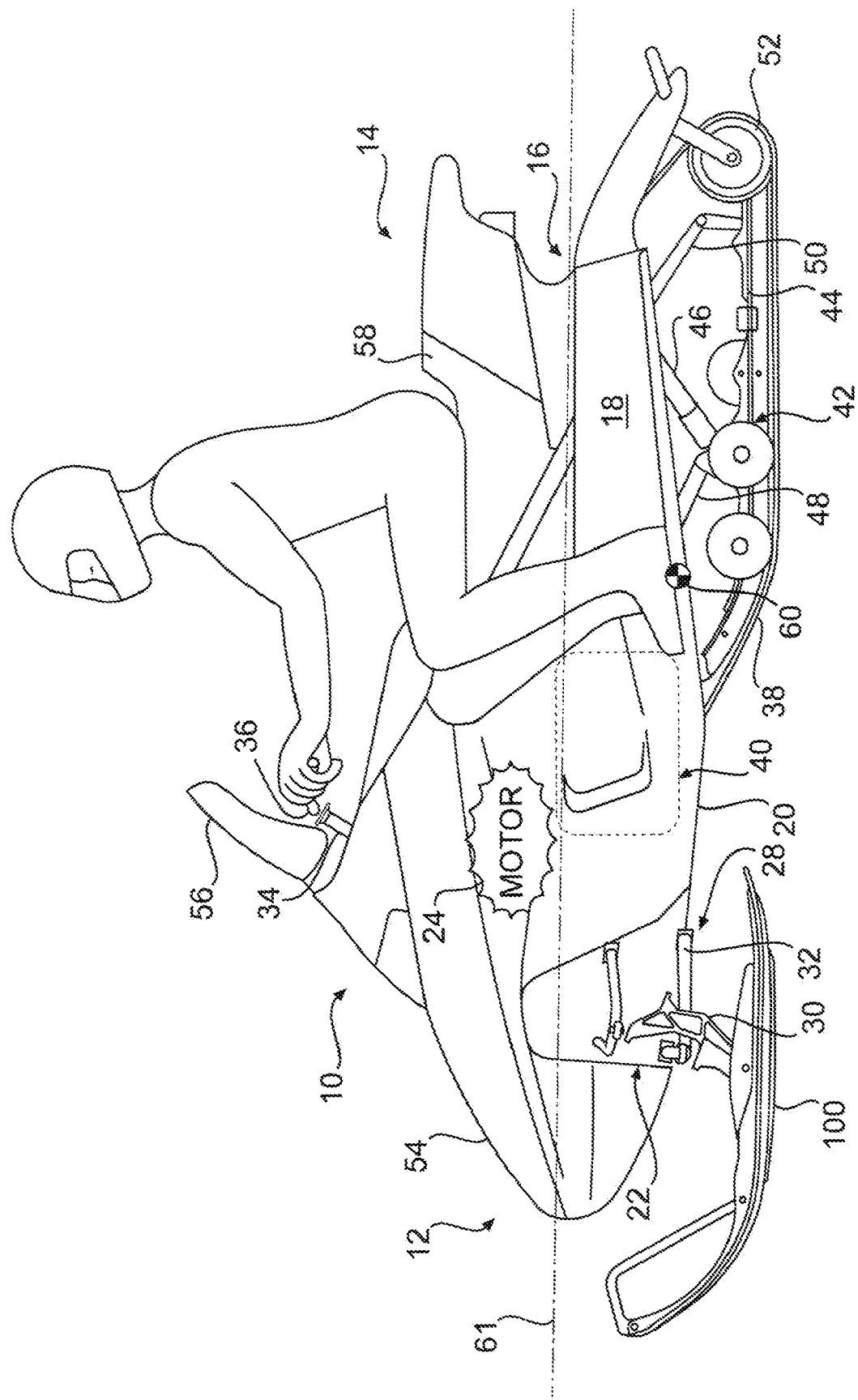
FIG. 3 is a side view of a snowmobile capable of incorporating a ski in accordance with an embodiment of the present invention.

Referring now to FIG. 3, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 12 and a rearward end 14 which are defined consistently with a travel direction of the vehicle. The snowmobile 10 includes a frame or chassis 16 which normally includes a rear tunnel 18, an engine cradle portion 20 and a front suspension assembly portion 22. An engine 24, which is schematically illustrated in FIG. 3, is carried by the engine cradle portion 20 of the frame 16. A ski and steering assembly (not indicated) is provided, in which two skis 100 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 100, in order to steer the vehicle.

An endless drive track 38 is positioned at the rear end 14 of the snowmobile 10 and is disposed under tunnel 18, being connected operatively to the engine 24 through a belt transmission system 40 which is schematically illustrated by broken lines in FIG. 3. Thus, the endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the frame (chassis) 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 3, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an engine output shaft (not shown) that rotates about a horizontally disposed axis that extends generally transversely to a longitudinal centerline 61 of the snowmobile 10. The engine output shaft drives the belt transmission system 40 for transmitting torque to the endless drive track 38 for propulsion of the snowmobile 10.

A straddle-type seat 58 is positioned atop the frame 16 and extends from the rear end 14 of the snowmobile 10 to the fairings 54. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 4:
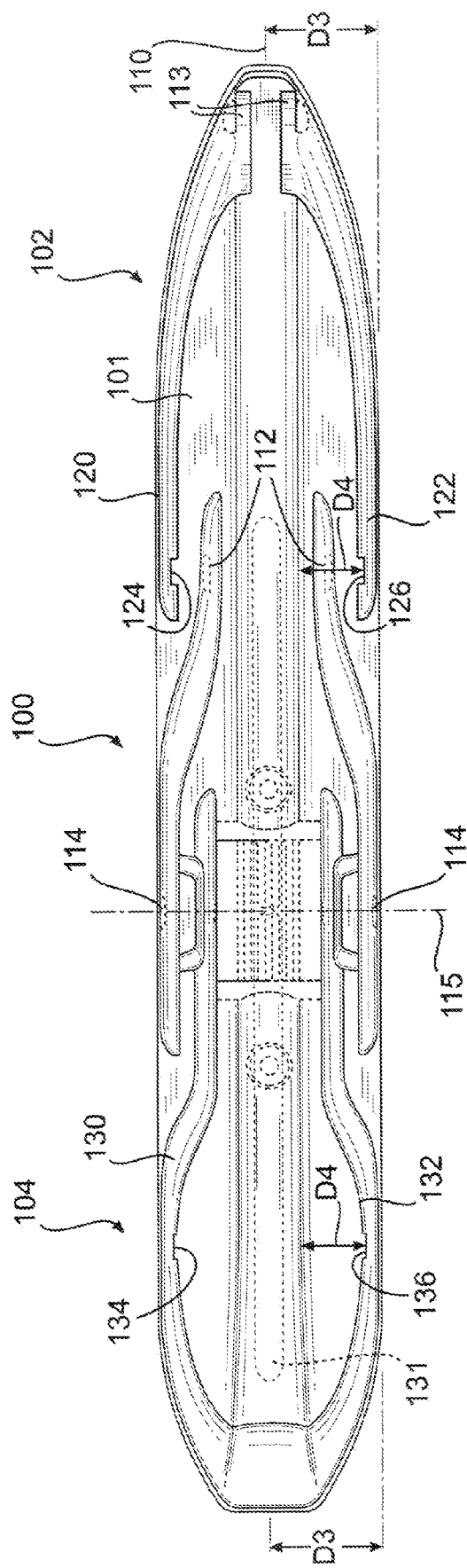
FIG. 4 is a top plan view of a snowmobile ski in accordance with a preferred embodiment of the present invention.
Figure 5:
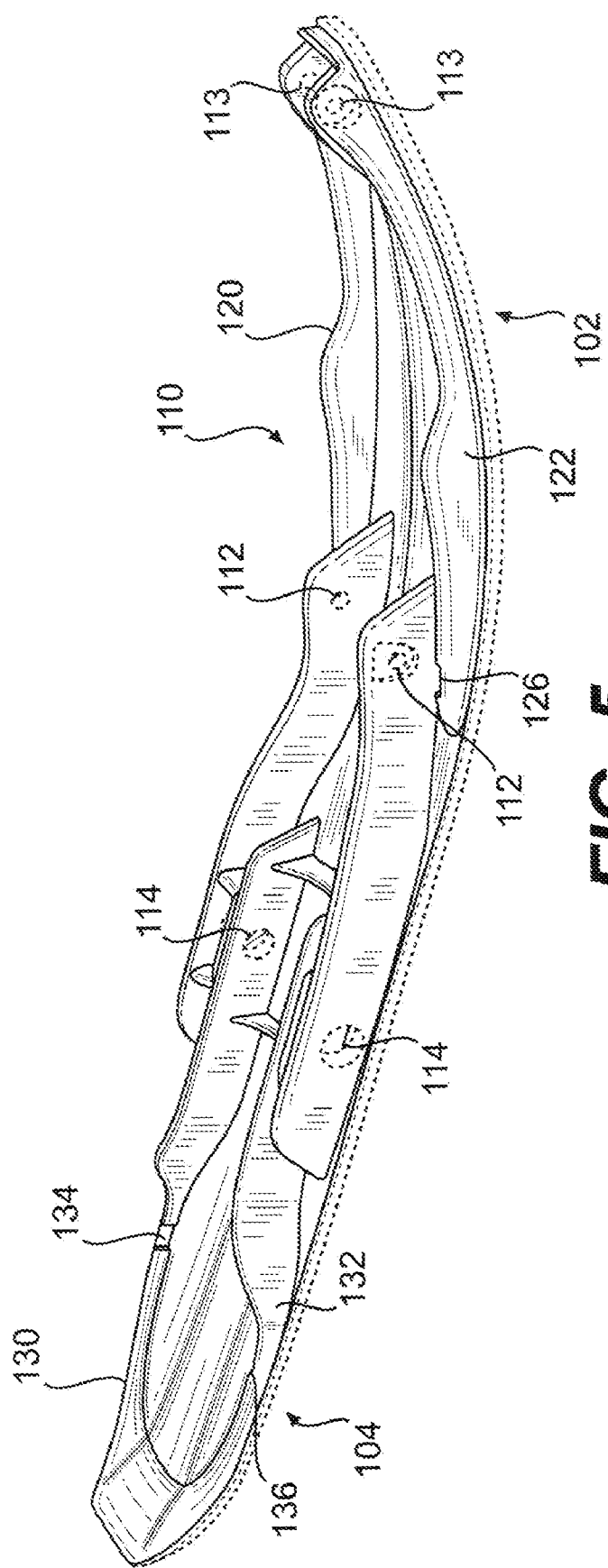
FIG. 5 is an isometric perspective view of a snowmobile ski in accordance with the preferred embodiment of the present invention.

In accordance with embodiments of the present invention, the snowmobile 10 includes a pair of front skis 100 which have front and rear alignment points to facilitate alignment or realignment of the skis. As illustrated in FIGS. 4 and 5, a front alignment point is located on a front portion of the ski to define a front reference point for measuring a distance D1 between the front alignment point and a corresponding front alignment point on a "paired" ski, i.e. on the other ski of the pair of front skis. A rear alignment point is located on a rear portion of the ski, thus defining a second reference point for measuring a distance D2 between the rear alignment point and a corresponding rear alignment point on the paired ski. The measurements D1 and D2 enable a single user to align or realign the pair of skis.

Preferably, the front alignment point includes a flat surface substantially parallel to a central longitudinal axis of the ski, the flat surface being capable of receiving an end of a tape measure used to measure the distance D1 between the front alignment point and the corresponding front alignment point on the paired ski. Also, the rear alignment point preferably includes a flat surface substantially parallel to the central longitudinal axis of the ski, the flat surface being capable of receiving the end of the tape measure used to measure the distance D2 between the rear alignment point and the corresponding rear alignment point on the paired ski.

FIGS. 4 and 5 are a top plan view and an isometric perspective view, respectively, of a snowmobile ski 100 in accordance with a preferred embodiment of the present invention. The ski 100 has a front portion 102 and a rear portion 104 and a central longitudinal axis 110 adapted to be aligned with the forward direction of the snowmobile. The ski further includes front attachment points 112 and 113 to which a handle (not shown) is attached. Rear attachment points 114, pivotally connect to the front suspension assemblies of the snowmobile 10 in a manner well known in the art such that the ski pivots about a pivot axis 115.

As shown in FIGS. 4 and 5, the ski 100 has a relatively flat base portion 101 with a front outer left rib 120 and a front outer right rib 122. The ski 100 also has a rear outer left rib 130 and a rear outer right rib 132. The front outer left rib 120 includes a front left notch 124 for receiving an end of a tape measure (not shown). The front outer right rib 122 also includes a front right notch 126 for receiving the end of the tape measure. Similarly, the rear outer left rib 130 includes a rear left notch 134 and the rear outer right rib 132 includes a rear right notch 136, which are also adapted to receive the end of a tape measure. The tape measure can be hooked onto corresponding front notches of paired skis in order to obtain a distance D1. A distance D2 is measured between corresponding rear notches of the paired skis. If D1<D2, the skis are misaligned (toed-in) and therefore the user needs to straighten the skis to make D1 equal to D2 (or at least as close as possible). Likewise, if D1>D2, the skis are also out of alignment (toed-out) and the user will need to rotate the front portion of the skis toward each other to make D1 substantially equal to D2.

Preferably, the front and rear alignment points are laterally equidistant from the central longitudinal axis 110 of a distance D3 and/or skag 131 of a distance D4 of each ski. Depending on the type of ski, D3 could be equal to D4 or not. This facilitates measurement of the distances D1 and D2. However, a person of ordinary skill should be able to appreciate that the alignment points need not be equidistant from the skags or central longitudinal axes of the skis. The measurements D1 and D2 are still useful, but one would need to know, in addition, the difference in distance between the front and rear alignment points to the central longitudinal axis or skag of the ski.

Preferably, the front and rear alignment points include a flat surface (i.e. a "vertical wall") that is substantially parallel to the central longitudinal axis of the ski. Such a flat surface facilitates holding or abutting the end of the tape measure. However, a flat surface is not necessary, as other shapes could be used as alignment points. Indeed, alignment points could be provided on strengthening ribs of the ski at marked locations where the front and rear alignment points are of an equal distance to the central longitudinal axis (or skag). Where the rib runs longitudinally, a mark, arrow, emboss, peg or indication can be provided to indicate where exactly the alignment point is, and hence where the measurements D1 and D2 are to be taken. The alignment points need not be on a vertical extending rib but could also be situated along the edge of the ski. As would be appreciated by one skilled in the art, as long as the alignment points are equidistant from one of the longitudinal axis or the skag of the ski, the alignment points can be on any part of the ski.

In operation, therefore, the skis 100 can be aligned using a method entailing the following steps: a user measures a front distance D1 between corresponding front alignment points on the skis, e.g. between corresponding front notches. The user also measures a rear distance D2 between corresponding rear alignment points on the skis, e.g. between corresponding rear notches. The user then compares D1 with D2. If D1<D2, then the skis are toed-in and therefore the user adjusts the relative yaw angle of the skis to make D1 equal to D2. If D1>D2, then the skis are toed-out and therefore the user adjusts the relative yaw angle of the skis to make D1 equal to D2. After the adjustment of the yaw angle, the user re-measures D1 and D2. If D1 is still not equal to D2, the user readjusts the yaw angle of the skis. Each subsequent iteration of this method, if performed with care, should bring the skis closer and closer into parallel alignment with each other.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:

1. A method for aligning a pair of skis on a snowmobile, the pair of skis including a first ski and a second ski, each of the first and second skis having a pivot axis, a front portion forward of the pivot axis, and a rear portion rearward of the pivot axis, one of the first ski and the second ski having a front recess at a first location on the front portion thereof, the other of the first ski and the second ski having a front alignment point at a location on the front portion thereof corresponding to the first location, one of the first ski and the second ski having a rear recess at a second location on the rear portion thereof, the other of the first ski and the second ski having a rear alignment point at a location on the rear portion thereof corresponding to the second location, the method comprising:

measuring a front distance D1 between the front recess and the front alignment point;

measuring a rear distance D2 between the rear recess and the rear alignment point; and readjusting the first and second skis to make D1 equal to D2.

2. The method of claim 1, wherein measuring the front distance D1 includes hooking an end of a tape measure in the front recess; and wherein measuring the rear distance D2 includes hooking the end of the tape measure in the rear recess.

3. A snowmobile ski comprising:
a base, the base having a pivot axis about which the ski is pivotally connected to a snowmobile, and the base having a central longitudinal axis;
a front portion forward of the pivot axis;
a rear portion rearward of the pivot axis;
a front alignment point in the front portion; and
a rear alignment point in the rear portion, one of the front alignment point and the rear alignment point including a recess.

4. The snowmobile ski of claim 3, wherein the recess is configured to receive an end of a tape measure.

5. The snowmobile ski of claim 3, wherein the one of the front alignment point and the rear alignment point including a recess is the front alignment point and the recess is a front recess; and wherein the rear alignment point includes a rear recess.

6. The snowmobile ski of claim 5, wherein the front recess and the rear recess each define a surface substantially parallel to the central longitudinal axis.

7. The snowmobile ski of claim 5, wherein the front recess and the rear recess are laterally offset from the central longitudinal axis.

8. The snowmobile ski of claim 7, wherein the front recess and the rear recess are laterally equidistant from the central longitudinal axis.

9. The snowmobile ski of claim 7, wherein the front alignment point is a first front alignment point and the rear alignment point is a second rear alignment point; and further comprising:

a second front alignment point in the front portion, the second front alignment point including a front recess being laterally offset from the central longitudinal axis on a side of the central longitudinal axis opposite a side on which the front recess of the first front alignment point is located; and a second rear alignment point in the rear portion, the second rear alignment point including a rear recess being laterally offset from the central longitudinal axis on a side of the central longitudinal axis opposite a side on which the rear recess of the first rear alignment point is located.

10. The snowmobile ski of claim 5, further comprising at least one rib disposed on the base, the at least one rib extending generally in a longitudinal direction of the ski;

wherein the front recess and the rear recess are disposed on the at least one rib.

11. The snowmobile ski of claim 10, wherein the front recess and the rear recess are disposed at a top of the at least one rib.

12. The snowmobile ski of claim 11, wherein the at least one rib is laterally offset from the central longitudinal axis.

13. The snowmobile ski of claim 11, wherein the at least one rib includes a front rib disposed at least in part in the front portion and a rear rib disposed at least in part in the rear portion; and wherein the front recess is disposed on the front rib and the rear recess is disposed on the rear rib.

14. The snowmobile ski of claim 13, wherein the front rib and the rear rib are laterally offset from the central longitudinal axis.

15. The snowmobile ski of claim 14, wherein the front recess and the rear recess are laterally equidistant from the central longitudinal axis.

16. A snowmobile comprising:
a frame, the frame including a tunnel;
an engine disposed on the frame;
a drive track disposed below and supported by the tunnel, the drive track being operatively connected to the engine;
a straddle seat disposed on the tunnel;
a front suspension assembly connected to the frame;
a first ski connected to the front suspension assembly, the first ski including:
a first base, the first base having a first pivot axis about which the first ski is pivotally connected to the front suspension assembly, and the first base having a first central longitudinal axis;
a first front portion forward of the first pivot axis;
a first rear portion rearward of the first pivot axis;
a first front alignment point at a first location in the first front portion; and
a first rear alignment point at a second location in the first rear portion;
a second ski connected to the front suspension assembly, the second ski including:
a second base, the second base having a second pivot axis about which the second ski is pivotally connected to the front suspension assembly, and the second base having a second central longitudinal axis;
a second front portion forward of the second pivot axis;
a second rear portion rearward of the second pivot axis;
a second front alignment point at a location in the second front portion corresponding to the first location;
a second rear alignment point at a location in the second rear portion corresponding to the second location;
one of the first front alignment point and the second front alignment point including a front recess; and
one of the first rear alignment point and the second rear alignment point including a rear recess.

17. The snowmobile of claim 16, wherein the one of the first front alignment point and the second front alignment point including a front recess is the first front alignment point and the front recess is a first front recess;

wherein the one of the first rear alignment point and the second rear alignment point including a rear recess is the first rear alignment point and the rear recess is a first rear recess.

18. The snowmobile of claim 17, wherein the second front alignment point includes a second front recess; and wherein the second rear alignment point includes a second rear recess.

19. The snowmobile of claim 18, wherein the first ski further includes at least one first rib disposed on the first base, the at least one first rib extending generally in a longitudinal direction of the first ski;

wherein the first front recess and the first rear recess are disposed on the at least one first rib;

wherein the second ski further includes at least one second rib disposed on the second base, the at least one second rib extending generally in a longitudinal direction of the second ski; and wherein the second front recess and the second rear recess are disposed on the at least one second rib.

20. The snowmobile of claim 19, wherein the first front recess and the first rear recess are disposed at a top of the at least one first rib; and wherein the second front recess and the second rear recess are disposed at a top of the at least one second rib.

21. The snowmobile of claim 19, wherein the at least one first rib is laterally offset from the first central longitudinal axis; and wherein the at least one second rib is laterally offset from the second central longitudinal axis.

22. The snowmobile of claim 19, wherein the at least one first rib includes a first front rib disposed at least in part in the first front portion and a first rear rib disposed at least in part in the first rear portion;

wherein the first front recess is disposed on the first front rib and the first rear recess is disposed on the first rear rib;

wherein the at least one second rib includes a second front rib disposed at least in part in the second front portion and a second rear rib disposed at least in part in the second rear portion;

wherein the second front recess is disposed on the second front rib and the second rear recess is disposed on the second rear rib.

23. The snowmobile of claim 22, wherein the first front rib and the first rear rib are laterally offset from the first central longitudinal axis; and wherein the second front rib and the second rear rib are laterally offset from the second central longitudinal axis.

24. The snowmobile of claim 18, wherein a distance from the first front recess to the second front recess is equal to a distance from the first rear recess to the second rear recess.

\* \* \* \* \*